US009283475B2

(12) United States Patent
Inubushi et al.

(10) Patent No.: US 9,283,475 B2
(45) Date of Patent: Mar. 15, 2016

(54) GAME SYSTEM, GAME APPARATUS AND COMPUTER PROGRAM FOR GAME

(75) Inventors: Takashi Inubushi, Tokyo (JP); Yoshihiko Narita, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 1380 days.

(21) Appl. No.: 12/097,086

(22) PCT Filed: Feb. 28, 2006

(86) PCT No.: PCT/JP2006/304191
§ 371 (c)(1),
(2), (4) Date: Jun. 12, 2008

(87) PCT Pub. No.: WO2007/077635
PCT Pub. Date: Jul. 12, 2007

(65) Prior Publication Data
US 2009/0163276 A1  Jun. 25, 2009

(30) Foreign Application Priority Data
Dec. 28, 2005 (JP) ................................. 2005-380413

(51) Int. Cl.
*A63F 9/24* (2006.01)
*A63F 13/40* (2014.01)

(52) U.S. Cl.
CPC ........... *A63F 13/10* (2013.01); *A63F 2300/303* (2013.01); *A63F 2300/305* (2013.01); *A63F 2300/638* (2013.01); *A63F 2300/65* (2013.01); *A63F 2300/66* (2013.01); *A63F 2300/8047* (2013.01)

(58) Field of Classification Search
USPC .................................. 463/1, 7, 36, 43; 84/609
See application file for complete search history.

(56) References Cited

U.S. PATENT DOCUMENTS 5,469,740 A * 11/1995 French et al. .............. 73/379.04
6,227,973 B1 * 5/2001 Kikuchi ......................... 463/31
(Continued)

FOREIGN PATENT DOCUMENTS

| JP | 03-288193 | 12/1991 |
| JP | 05-232978 | 9/1993 |

(Continued)

*Primary Examiner* — Paul A D'Agostino
*Assistant Examiner* — Brandon Gray
(74) *Attorney, Agent, or Firm* — Locke Lord LLP

(57) ABSTRACT

To provide a game system to perform various modifications to a tune being reproduced for game background displayed together with the tune, without the uncomfortable feeling, but with restriction of amount of memory consumption. The game system of the present invention is a game system (1) which informs a player of the operation timings of operation members (11) to a tune to be reproduced by a display device (3), wherein the game system (1) has background image data (24) for displaying game background image (34) by the display device (3), a break position monitoring device (7c) for monitoring at least one break positions set in the tune in units of beats during which the tune is reproduced, and a background image control device (7d) for controlling the appearance of modification of the game background image (34) so that the appearance of modification changes depending on the play situation of the player when the break position is recognized by the break position monitoring device (7c).

14 Claims, 15 Drawing Sheets

(56) References Cited

U.S. PATENT DOCUMENTS

| | | | |
|---|---|---|---|
| 2001/0004861 A1* | 6/2001 | Suzuki et al. | 84/609 |
| 2001/0015123 A1* | 8/2001 | Nishitani et al. | 84/615 |
| 2002/0025841 A1* | 2/2002 | Nobe et al. | 463/1 |
| 2004/0229685 A1* | 11/2004 | Smith et al. | 463/29 |
| 2004/0263532 A1 | 12/2004 | Hayashi | |
| 2006/0094502 A1* | 5/2006 | Katayama et al. | 463/31 |

FOREIGN PATENT DOCUMENTS

| | | |
|---|---|---|
| JP | 05-323980 | 12/1993 |
| JP | 07-271386 | 10/1995 |
| JP | 09-179575 | 7/1997 |
| JP | 11-352978 | 12/1999 |
| JP | 2001-353374 | 12/2001 |
| JP | 2005-031389 | 2/2005 |

* cited by examiner

FIG. 5A

| 22a | Number of Data Pieces | | 22aC |
|---|---|---|---|
| 22aA | Elapsed Time | Number of Beats | 22aB |
| | Elapsed Time | Number of Beats | |
| | Elapsed Time | Number of Beats | |

| 22b | Number of Data Pieces | | 22bC |
|---|---|---|---|
| 22bA | Number of Beats | Rhythm | 22bB |
| | Number of Beats | Rhythm | |
| | Number of Beats | Rhythm | |

⋮

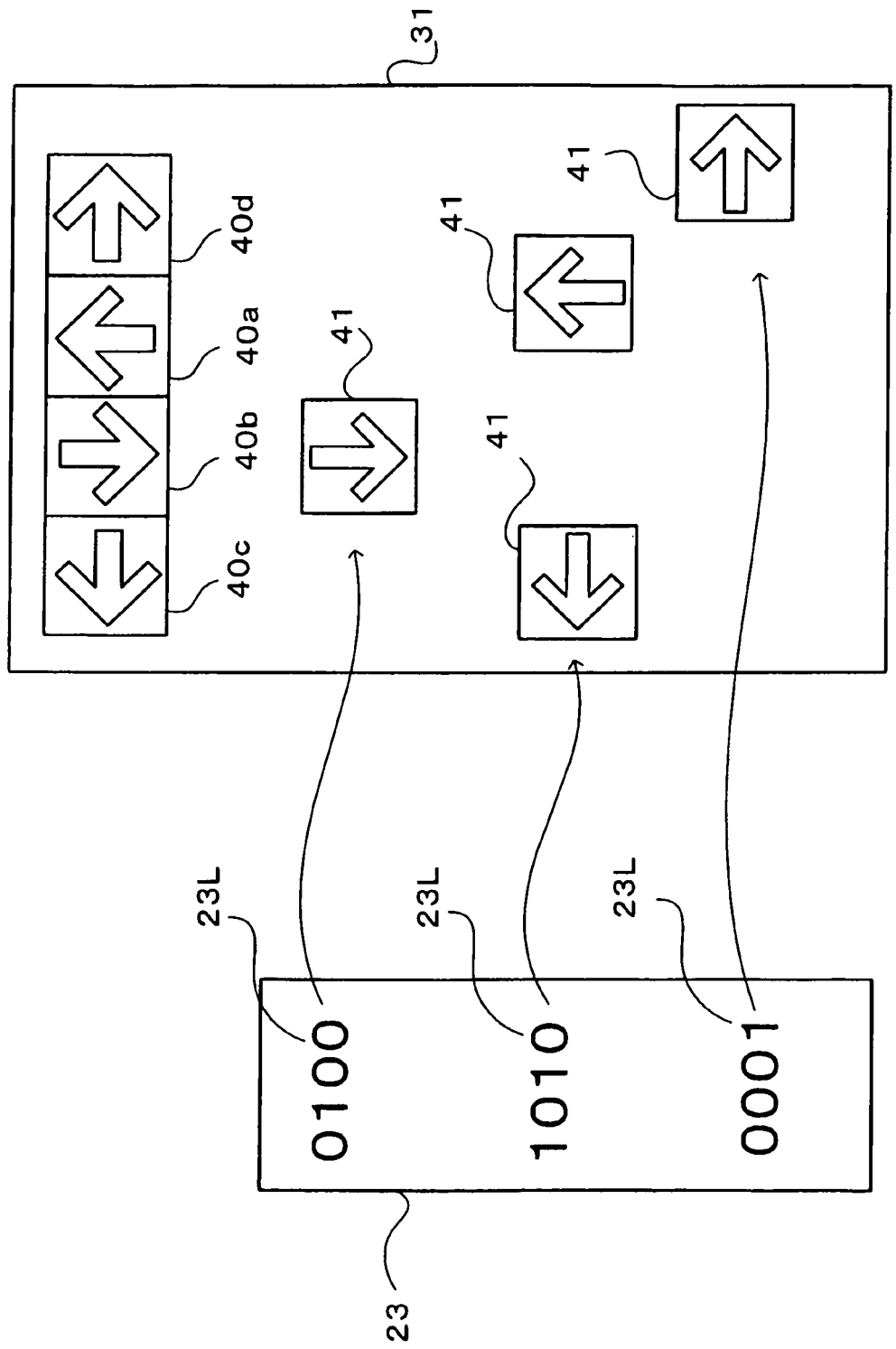

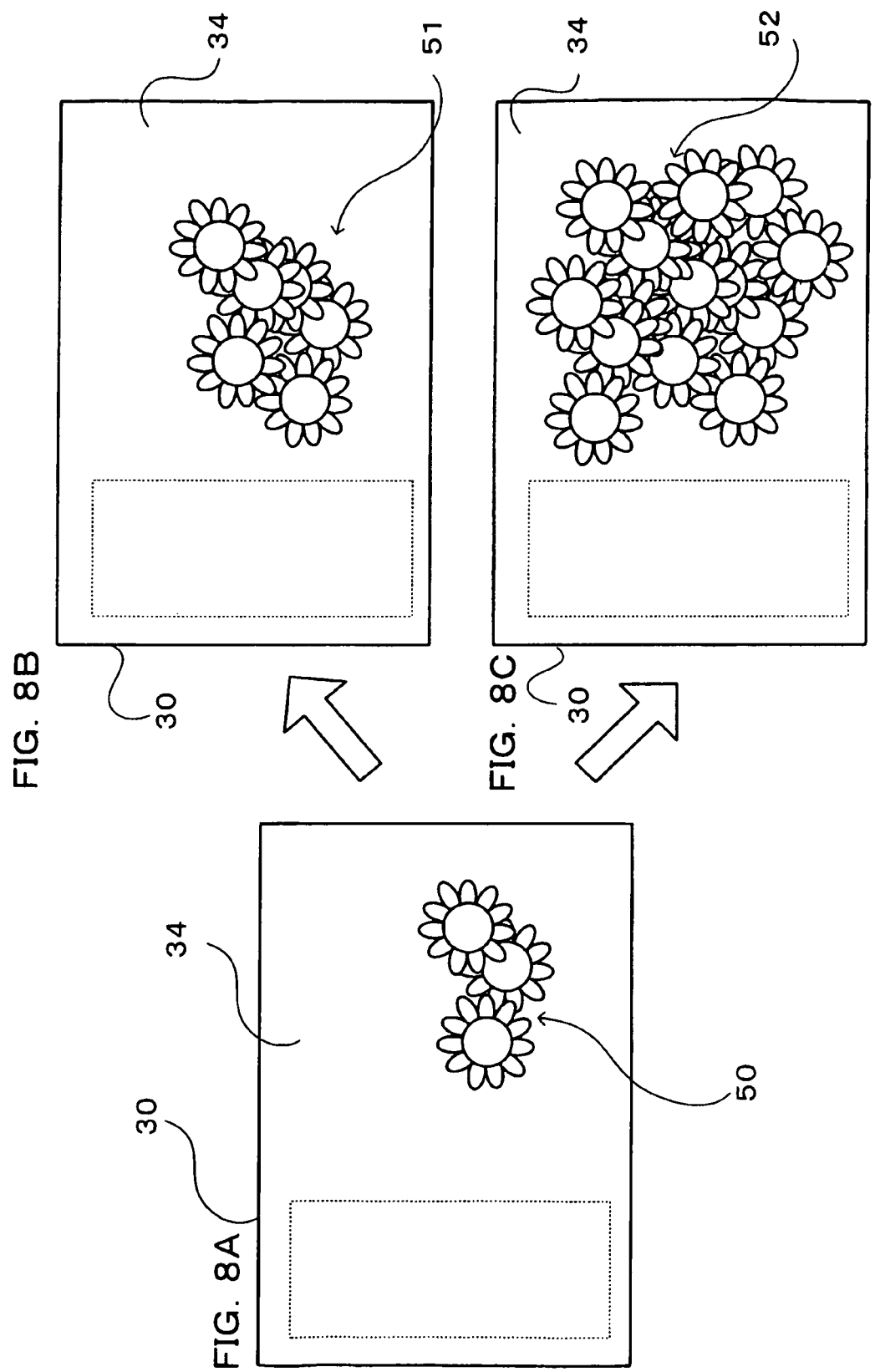

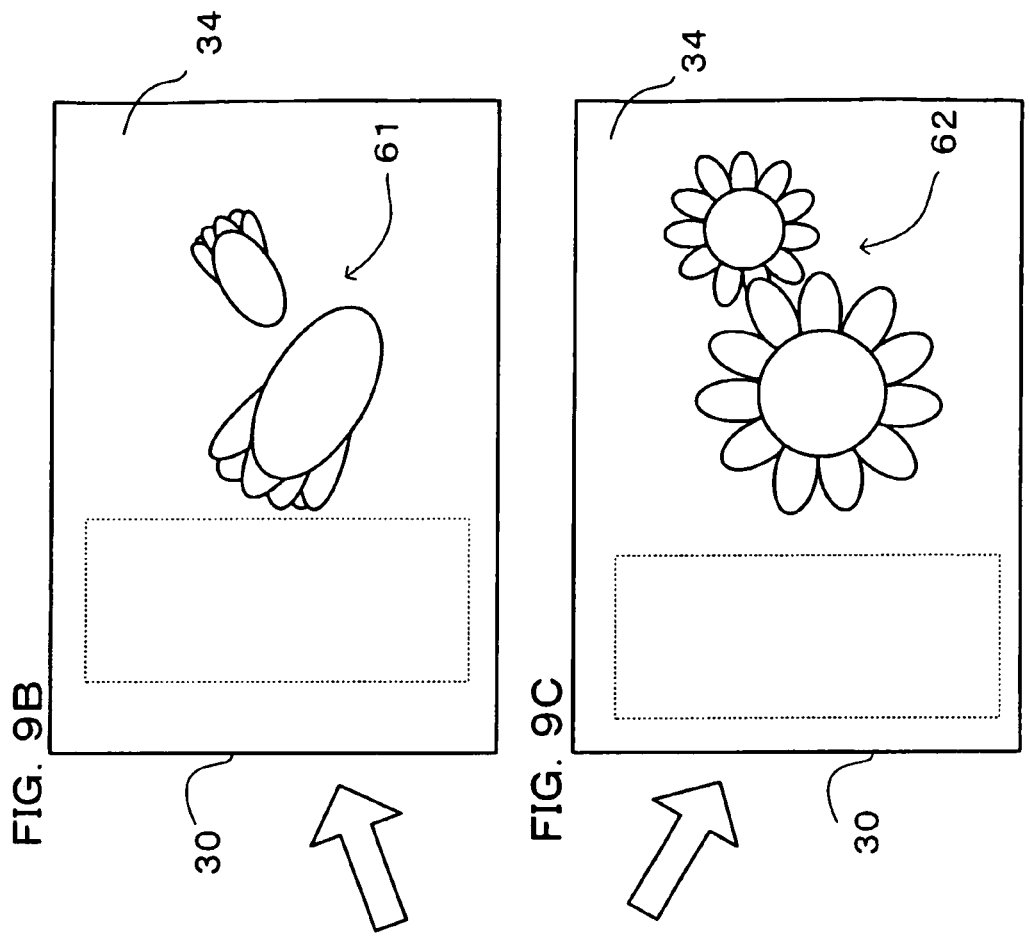
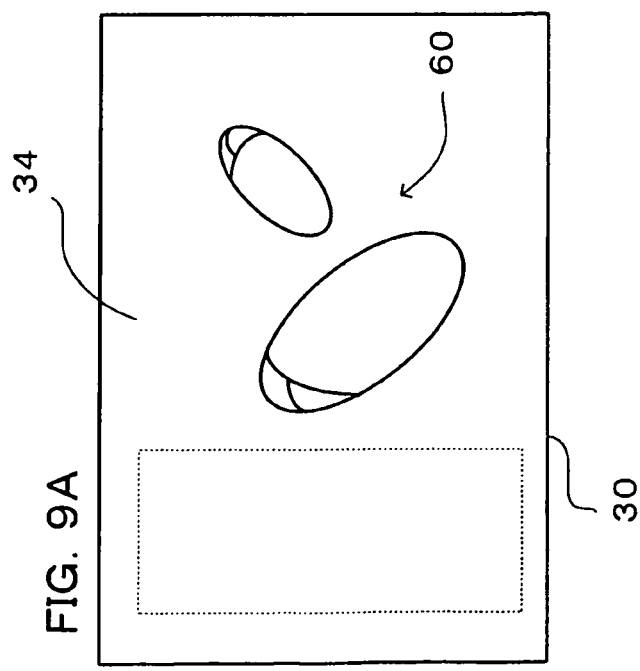

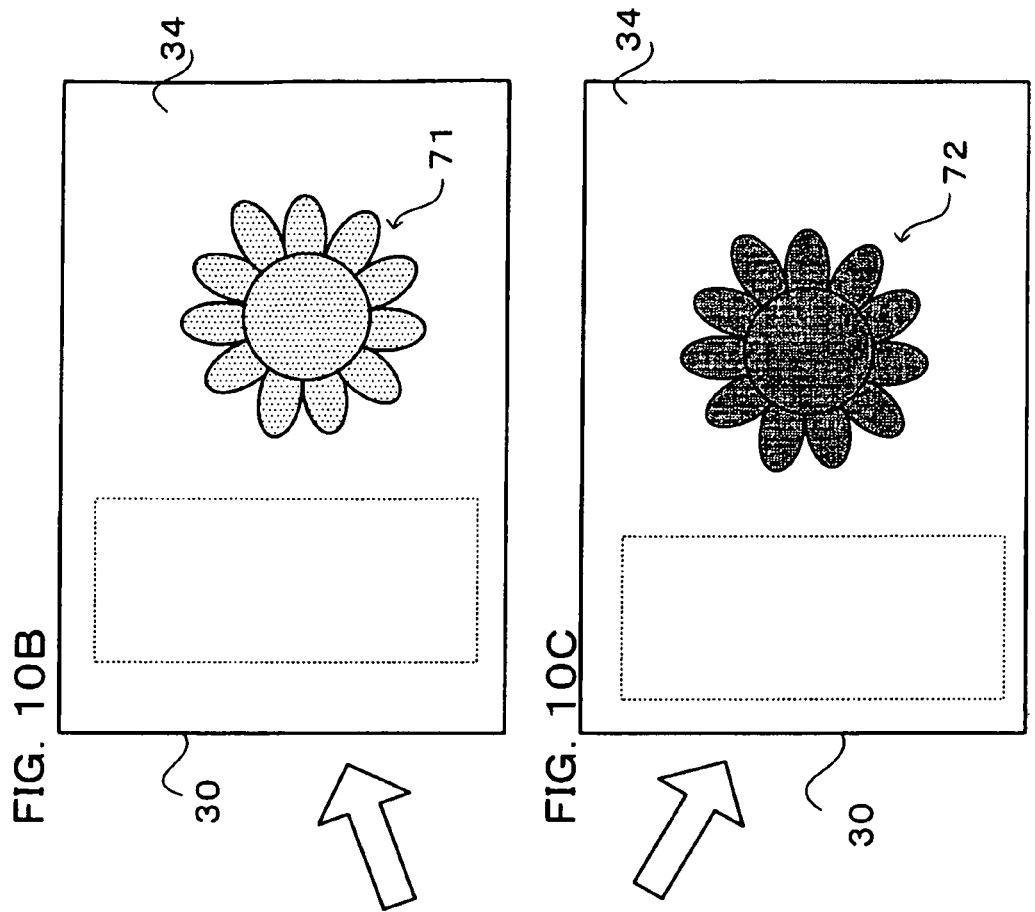
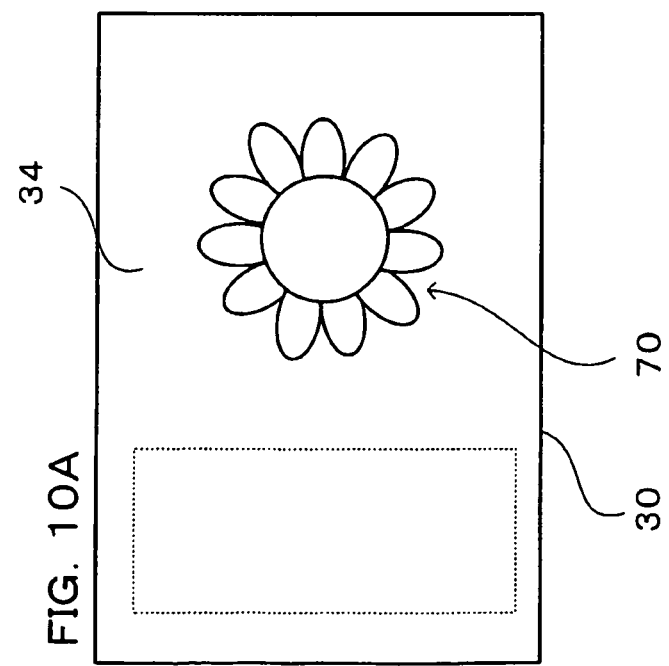

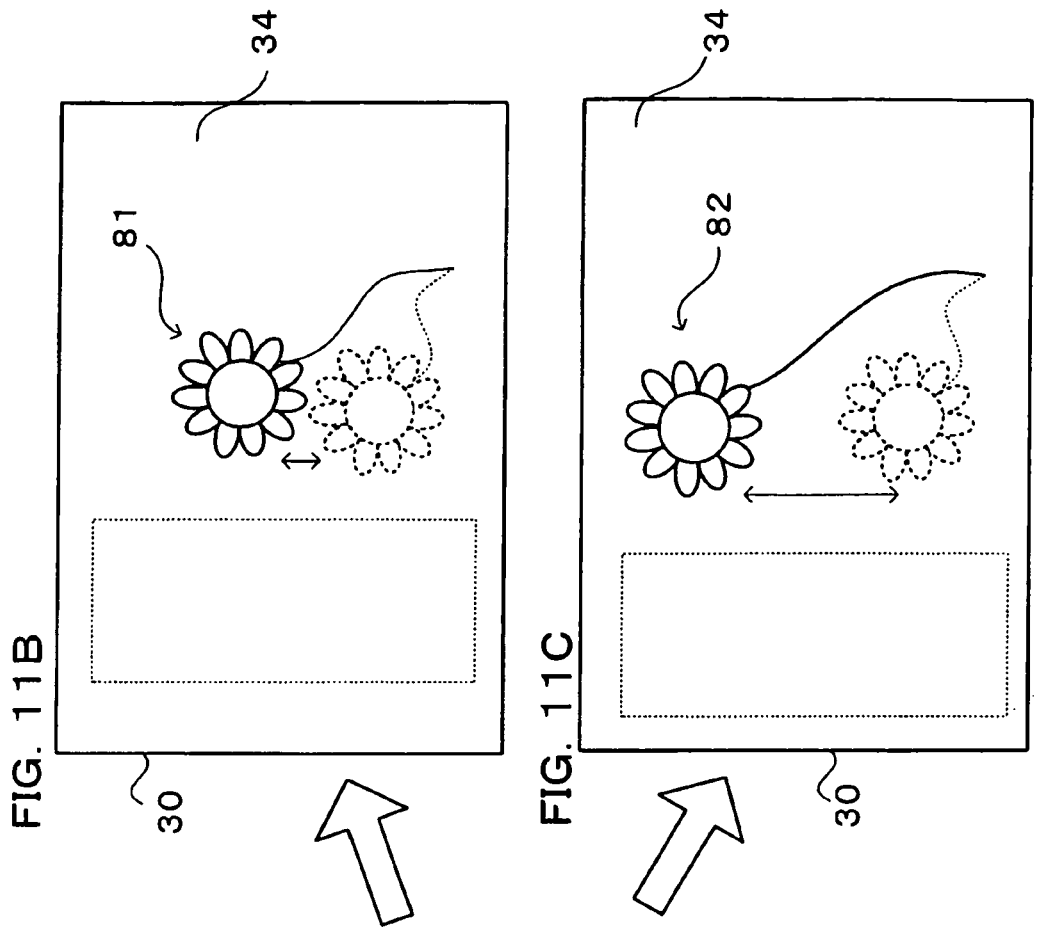
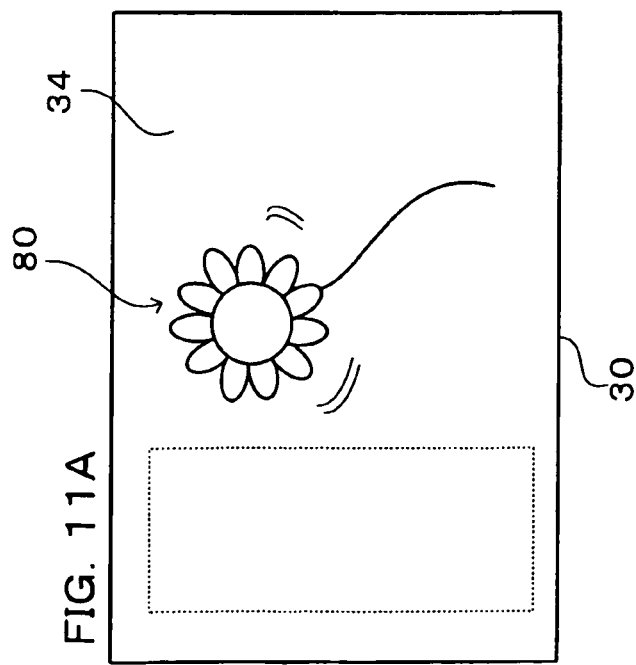
FIG. 11A
FIG. 11B
FIG. 11C

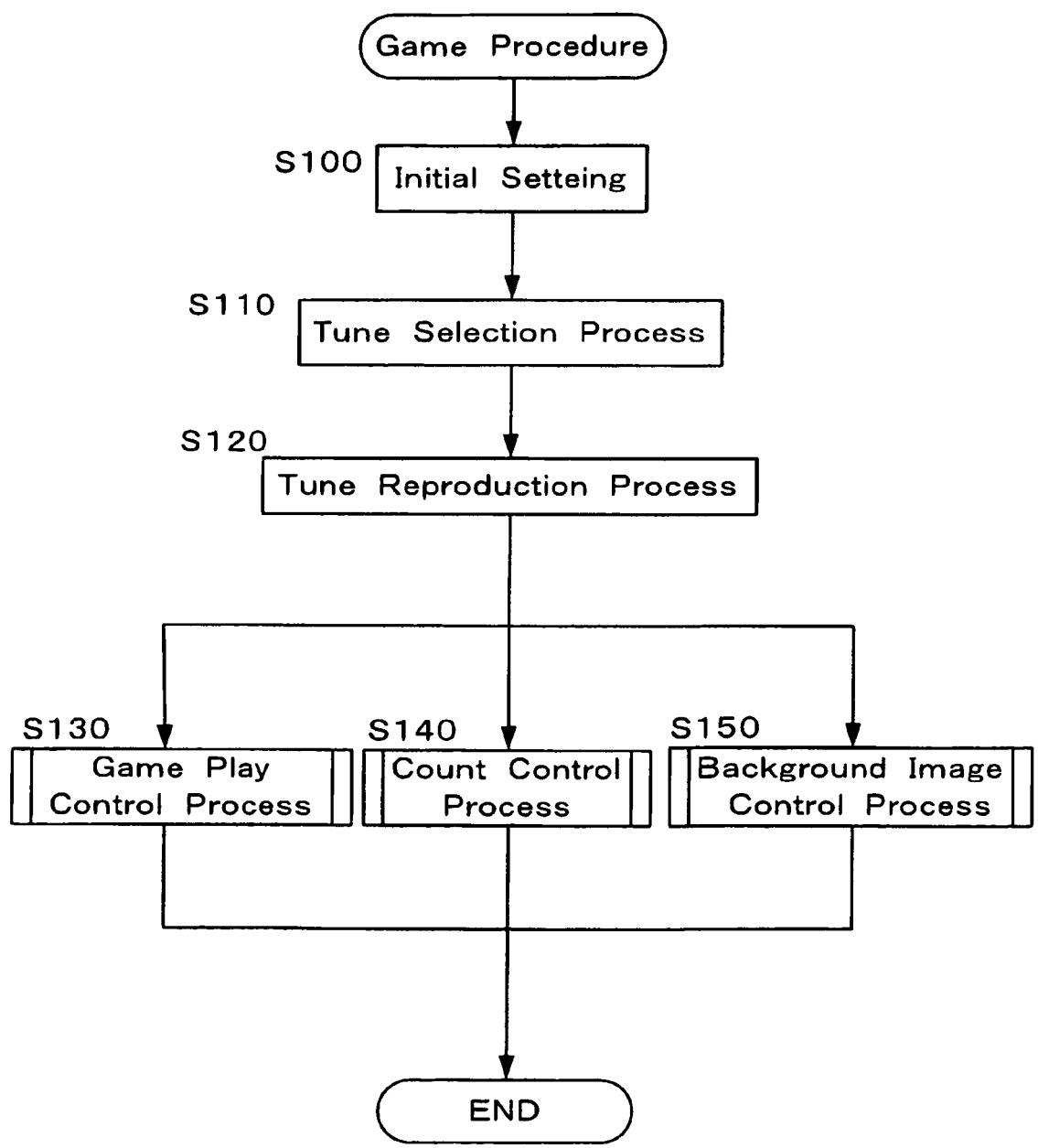

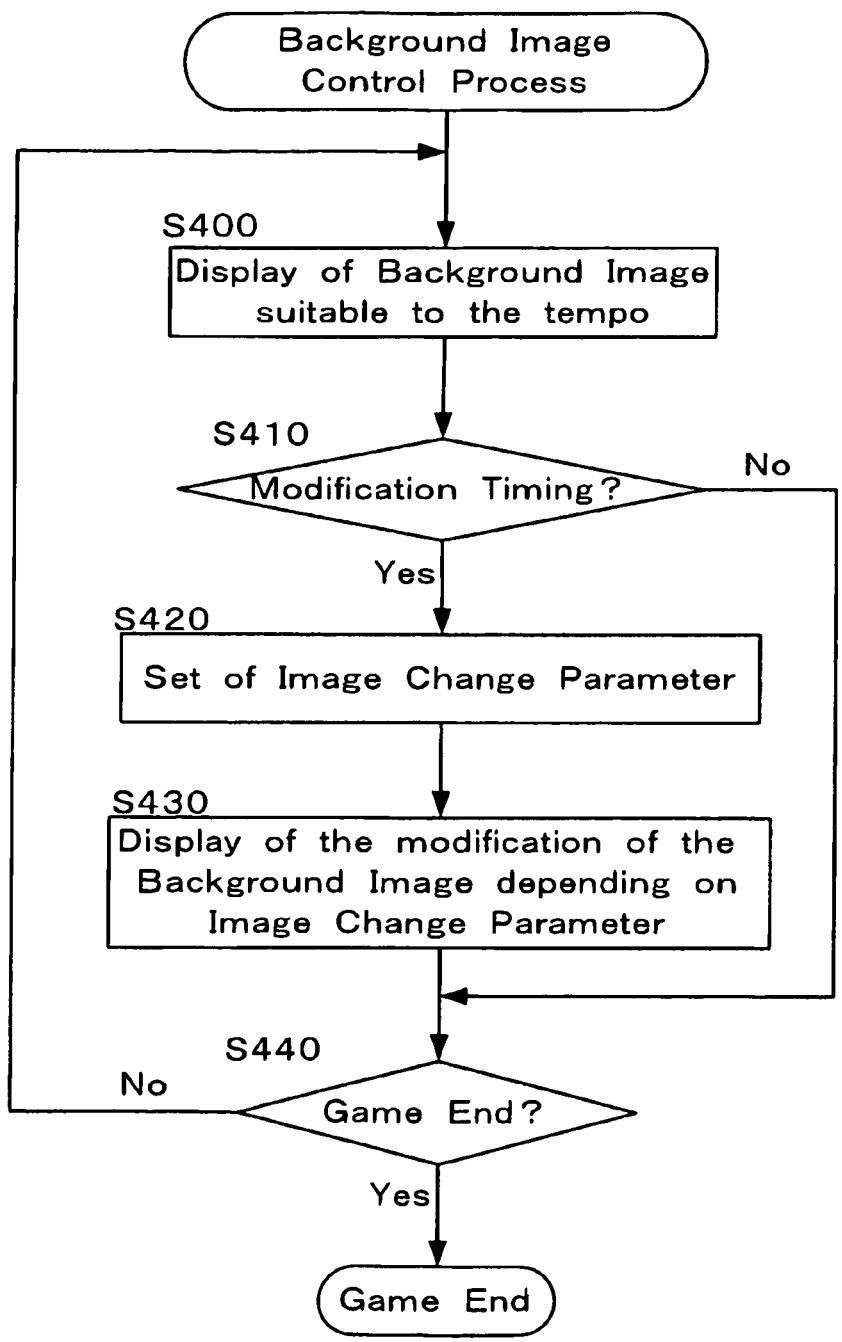

GAME SYSTEM, GAME APPARATUS AND COMPUTER PROGRAM FOR GAME

CROSS-REFERENCE TO PRIOR APPLICATIONS

This is a U.S. national phase application under 35 U.S.C. §371 of International Patent Application No. PCT/JP2006/304191, filed Feb. 28, 2006, and claims the benefit of Japanese Application No. 2005-380413, filed Dec. 28, 2005, both of which are incorporated by reference herein. The International Application was published in English on Jul. 12, 2007 as International Publication No. WO 2007/077635 A1 under PCT Article 21(2).

TECHNICAL FIELD

The present invention relates to a game system and a game apparatus for allowing a player to do predetermined operations to a tune, and a computer program for realizing the game apparatus

BACKGROUND ART

In a game system which makes a player, for example, step on panels of a foot panel to a tune, it has been already well-known that some marks are displayed to inform a player of the timing to step on the panel and which panel to be stepped on, and some predetermined game background image is displayed behind the marks. On the other hand, in a karaoke system where some background image is displayed with lyrics on a monitor, it has been already known that the method to add modification effects which differ from tune to tune by using small amount of image data (for example, laid-open application publication JP07-271386) and the method to make various types of background image by switching or inserting limited pieces of image data prepared in advance (for example, laid-open application publications JP05-232978, JP03-288193, JP05-323980).

DISCLOSURE OF THE INVENTION

According to the above mentioned game system, each game background image which differs from tune to tune is prepared for each tune in a format for movie. Accordingly, a storage medium for storing data concerning tunes requires the memory size not only for tunes and also for the game background image for each tune. Therefore, if the number of tunes increases or 3-dimensional animation is used in the background image, a big size of memory must be prepared. Especially, the case where a memory size of memory medium for storing data concerning tunes is restricted is a big problem. The modification of images by the above mentioned methods in karaoke systems is performed without any relationships with tempos and rhythms of tunes to be reproduced. Accordingly, it would cause the situation that the modifications of game background images are incongruent with tempos of a tune, which brings an uncomfortable feeling to a user.

In view of the above, it is an object of the present invention to provide a game system, a game apparatus and a game program for game to perform various modifications to a tune under reproduction for game background displayed together with the tune, without the uncomfortable feeling, but with restriction of amount of memory consumption.

A game system of the present invention can solve the above problems by the following: the game system comprising an input device for outputting signals in accordance with situations to be operated to operation members mounted thereon; a game information storage device for storing plural pieces of tune data for reproducing each tune and operation timing data being associated with each piece of the tune data and deciding operation timings of operating each of the operation members to the tune to be reproduced; a display device for displaying some image; a tune reproduction device for reproducing a tune based on the piece of tune data; and an operation guiding device for, based on the operation timing data of the tune reproduced by the reproduction device, informing a player of the operation timing of the operation member to the reproduced tune via the display device, wherein the game information storage device stores background image data for game background image displayed by the display device together with the reproduced tune, and the game system further comprises: a break position monitoring device for, during which the tune is reproduced, monitoring at least one break positions being set in units of beats; and a background image control device for controlling appearance of modification of the game background image so that the appearance of modification is changed depending on play situation of the player, when the break position monitoring device recognizes the break position in a middle of the tune being reproduced.

According to the game system of the present invention, as the background image data stored in the game information storage device is possible to be used for plural tunes, it is not needed to prepare the background image data for each tune. The break position monitoring device monitors break positions set based on number of beats. One of the break positions is recognized by the break position monitoring device, the game background image control device controls the appearance of modification of the game background image so that the modification occurs depending on the play situations of the player. Accordingly, the game background image is modified depending on the play situations. Therefore, even in the same tune, different appearances of modification can be represented for different play situations. Moreover, as each of the break positions is set in units of beats such as five beats or ten beats, the modification of game background image is executed to the beat. That is, as the modification of game background image is executed to the beat, which does not bring the uncomfortable feeling to the player. Therefore, it is possible to realize various modifications to tunes, without the uncomfortable feeling, but with the restriction of amount of memory consumption.

The number of beats for each space between the break positions can be equal to each other or can be different from each other. The beats of tune under reproduction can be obtained by counting directly the beats from the tune under reproduction by the conventional way or by using number of beats information to predetermined period such as BPM information and timekeeping the elapsed time of reproducing tune.

"Play situation" includes, for example, operation contents of a player, the elapsed time of playing, various kinds of parameters associated to a player, and play times. "To be changed depending on play situation of the player" includes the case where each of different positions of modification corresponds to each of different situations and the case the case where each of different appearances of modification corresponds to each of different to each of different situations at the same position of modification.

The display device includes the device for displaying predetermined image on a monitor and the device for projecting predetermined image on a screen or the like. "Game background image" is image for displaying during which a tune is reproduced, and it doesn't matter which only the background image is displayed on a monitor independently or as a background of some image, for example, for representing operation timings. Each of the devices included in the game system can be connected with each other by communication lines. For example, the game system may include a server administrating information stored in the game information storage device and the information may be used via the communication lines.

The game system of the present invention may further comprise an evaluation device for evaluating the situations to be operated to each of the operation members by the player, and the background image control device may control the appearance of modification of the game background image so that the appearance of modification changes depending on evaluation by the evaluation device. Thereby, as skill of player to the game can be determined by the evaluation device, the appearance of modification of the game background image can be made different from each other depending on the skill of player.

Tempo information having information relevant to tempo in at least one predetermined range in a tune may be further associated with the piece of tune data to be stored in the game information storage device, The break position monitoring device may have a timekeeping device for keeping elapsed time of a tune reproduced from a start position of the predetermined range of the tune and a beats count device for counting number of beats from the start position of the predetermined range in reference to the elapsed time kept by the timekeeping device and the tempo information.

Tempo is numbers of beats in a predetermined period. The time requested for one beat can be obtained. Thereby, from the elapsed time kept by the timekeeping device, it is possible to count the number of beats of the tune under the reproduction. Accordingly, the break position monitoring device can recognize the moment when the number of beats is incremented by the beats count device as the break position. The start position of the predetermined range can be the start position of reproducing a tune or can be in the middle of a tune.

The predetermined range may be a range from a start position of reproducing the tune to a position of changing tempos; the tempo information may include a piece of tempo data for each different tempo, the piece of tempo data comprising elapsed time and total number of beats which are associated with each other, the elapsed time being time from the start position of reproducing the tune to the position of changing tempos and the total number of beats being total number of beats at the moment of the elapsed time from the start position of reproducing the tune under a tempo corresponding to the elapsed time; Information indicating relationship between number of beats and the operation timing may be set in the operation timing data; the break position monitoring device may calculate a present tempo based on the elapsed time obtained by the timekeeping device; and the operation guiding device may inform the player of the operation timing so that a relationship between the elapsed time and the total number of beats indicated by each of the pieces of tempo data of the tempo information is equal to a relationship between the number of beats obtained by the operation timing data and the elapsed time obtained by the timekeeping device. Thereby, both the operation guiding device and the background image control device can use the same tempo information.

Rhythm information relevant to rhythm of each of the tunes may be associated with each piece of tune data to be stored in the game information storage device, and the break position monitoring device may have a bar counting device for counting number of bars of the tune being reproduced by the number of beats counted by the beats count device and the rhythm information. Thereby, as the break position monitoring device can count the number of bars, the break position can be set in units of bars. The space between the break positions can be one piece of bar or can be predetermined pieces of bars.

The background image control device may control the game background image to be displayed so that appearance of the game background image is different depending on the information relevant to tempo indicated by the tempo information. Thereby, the background image changed to the tempo of tune being reproduced can be displayed regardless of the play situation.

At least one image change parameters indicating amount of change of the game background image may be associated to the image data for the game background image, and the background control device may set a value of the image change parameter depending on the play situations and may control the appearance of modification of the game background image so that modification of the game background image occurs depending on the set value of the image change parameter. Thereby, the game background image where the degree of change is different depending on the play situation can be displayed. Moreover, when two types of the degrees of change such as four degrees type and ten degrees type are prepared, and an image change parameter for each type is prepared, different amount of change can be represented depending on type of modifications even for the same play situation.

A game apparatus of the present invention can solve the above problems by the following: the game apparatus comprising an input device for outputting signals in accordance with situations to be operated to operation members mounted thereon; a game information storage device for storing plural pieces of tune data for reproducing each tune and operation timing data being associated with each of the pieces of tune data and deciding operation timings of operating each of the operation members to the tune to be reproduced; a display device for displaying some image; an operation guiding device for, based on the operation timing data of the tune reproduced by the reproduction device, informing a player of the operation timing of the operation member to the reproduced tune via the display device, wherein the game information storage device stores background image data for game background image displayed by the display device together with the reproduced tune, and the game apparatus further comprises: a tune reproduction device for reproducing a tune based on the piece of tune data; a break position monitoring device for, during which the tune is reproduced, monitoring at least one break positions being set in units of beats; and a background image control device for controlling appearance of modification of the game background image so that the appearance of modification is changed depending on play situation of the player, when the break position monitoring device recognizes the break position in a middle of the tune being reproduced. The game apparatus of the present invention is one apparatus comprising the devices of the game system of the present invention. The meaning of each device and the meaning of each term is the same as the meaning described for the game system of the present invention.

A computer program for game stored on a computer readable medium of the present invention can solve the problem by the following: the computer program for game, stored on a computer readable medium, is encoded to allow a game apparatus to function as: an input device for outputting signals in accordance with situations to be operated to operation members mounted thereon; a game information storage device for storing plural pieces of tune data for reproducing each tune and operation timing data being associated with each of the pieces of tune data and deciding operation timings of operating each of the operation members to the tune to be reproduced, and background image data for game background image displayed by the display device together with the reproduced tune; a display device for displaying some image; a tune reproduction device for reproducing a tune based on the piece of tune data; an operation guiding device for, based on the operation timing data of the tune reproduced by the reproduction device, informing a player of the operation timing of the operation member to the reproduced tune via the display device, a break position monitoring device for, during which the tune is reproduced, monitoring at least one break positions being set in units of beats; and a background image control device for controlling appearance of modification of the game background image so that the appearance of modification is changed depending on play situation of the player, when the break position monitoring device recognizes the break position in a middle of the tune being reproduced. According to the computer program, the game apparatus for realizing the game system of the present invention can be provided. The meaning of each device and the meaning of each term are the same as the meaning described for the game system of the present invention.

As above mentioned, according to the present invention, the background image data of the game background image to be displayed together with the reproduction of a tune, at least one break positions set in the reproducing tune in units of beats are monitored during the reproduction, and when the break position is recognized in the tune under reproduction, the appearance of modification of the game background image is controlled so that the appearance is changed depending on the play situations of the player. Thereby, it is possible to provide a game system, a game apparatus and a computer program for game to perform various modifications to a tune for the game background displayed together with the tune, without the uncomfortable feeling, but with the restriction of amount of memory consumption.

BRIEF DESCRIPTION OF THE DRAWINGS

FIG. 5A is a diagram showing a data structure of tempo information;

FIG. 5B is a diagram showing a data structure of rhythm information;

FIG. 6 is a diagram showing a relationship between operation timing data and reference marks;

FIG. 8 is a diagram showing an example of appearance of modification of background image;

FIG. 9 is a diagram showing another example of appearance of modification of background image;

FIG. 10 is a diagram showing another example of appearance of modification of background image;

FIG. 11 is a diagram showing another example of appearance of modification of background image;

FIG. 12 is a flowchart showing process flow in the game procedure.

FIG. 15 is a flowchart showing process flow in the background image control process.

BEST MODE FOR CARRYING OUT THE INVENTION

Figure 1:
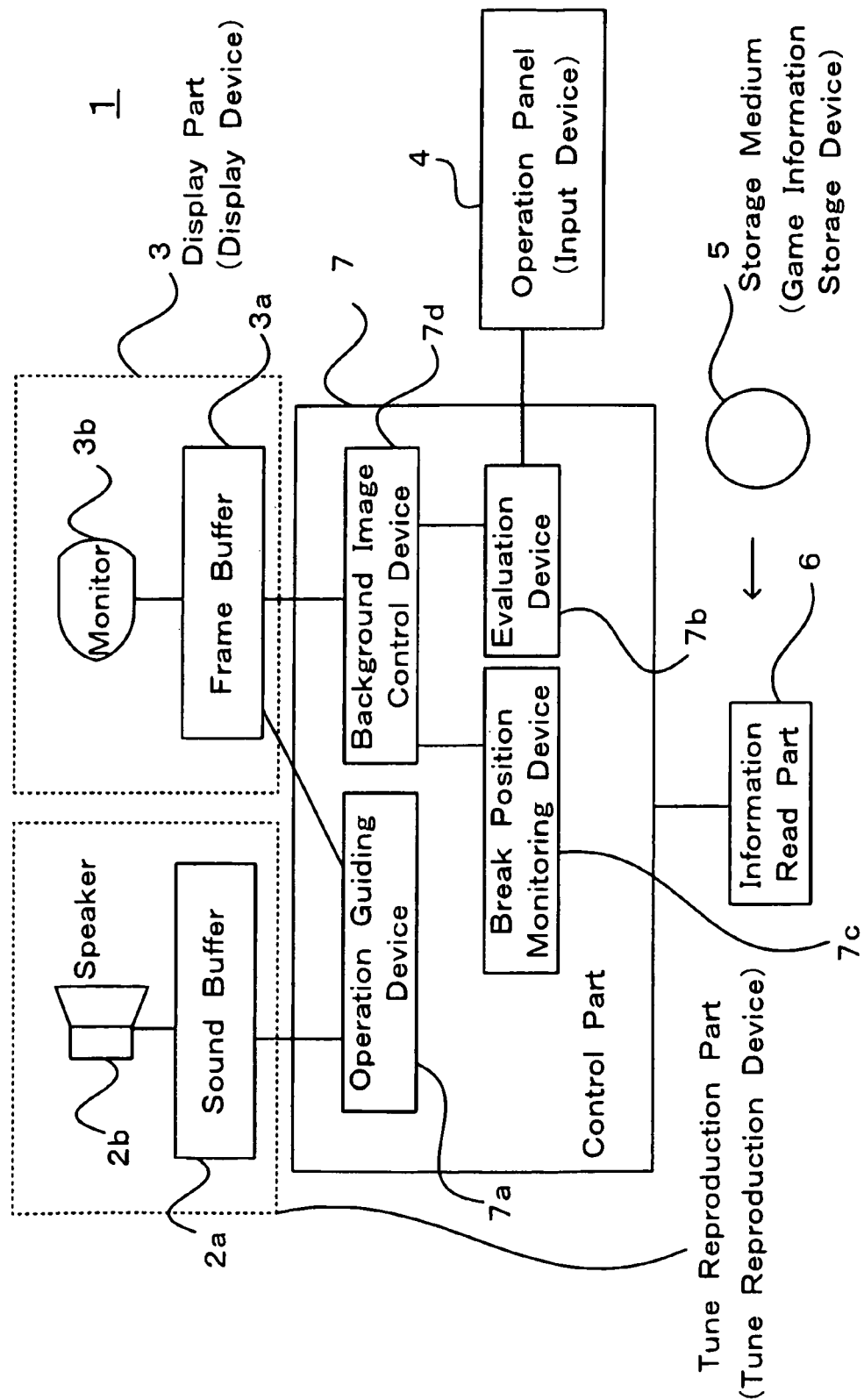
FIG. 1 is a diagram showing an example of hardware configuration of a game system of the present invention.

FIG. 1 is a diagram showing an example of hardware configuration of a game system 1 of the present invention. The game system 1 comprises a tune reproduction part 2 as a tune reproduction device, a display part 3 as a display device, an operation panel 4 as an input device to be operated by a player to operate, a storage medium 5 as a game information storage device, an information read part 6 for reading information stored in the storage medium 5, and the control part 7 for controlling each of the parts 2, 3, 4, 6. Additionally, the game system 1 may comprise an auxiliary storage apparatus.

The tune reproduction part 2 includes a sound buffer 2a and a speaker 2b. By the control part 7, tune data to be reproduced gets memorized to the sound buffer 2a and the reproduced tune is output from the speaker 2b. The display part 3 includes a frame buffer 3a and a monitor 3b. By the control part 7, image data for image to be displayed gets memorized to the frame buffer 3a, and the memorized image data is outputted to the monitor 3b.

The control part 7 constructed as a computer comprises a CPU (a control processing unit), an SPU (a sound processing unit), a GPU (a graphic processing unit), and various peripheral circuits such as RAM and ROM for performances of the processing units, to mainly function as an operation guiding device 7a, an evaluation device 7b, a break position monitoring device 7c, and a background image control device 7d. The ROM has, for example, computer programs for realizing the present invention. Information read by the information read part 6 is temporally held in the RAM.

The operation guiding device 7a informs a player of operation timings of operating the operation panel 4 to reproduced tunes via the monitor 3b. The evaluation device 7b evaluates player's play based on operation detecting signal outputted from the operation panel 4. When one of break positions predetermined in a tune being reproduced is recognized by the break position monitoring device 7c for monitoring the break positions, the background image control device 7d modifies a background image based on the evaluation obtained by the evaluation device 7b and displays the modified background image on the monitor 3b. For the above mentioned performances of the control part 7, various data read from the storage medium 5 is referred appropriately.

Figure 2:
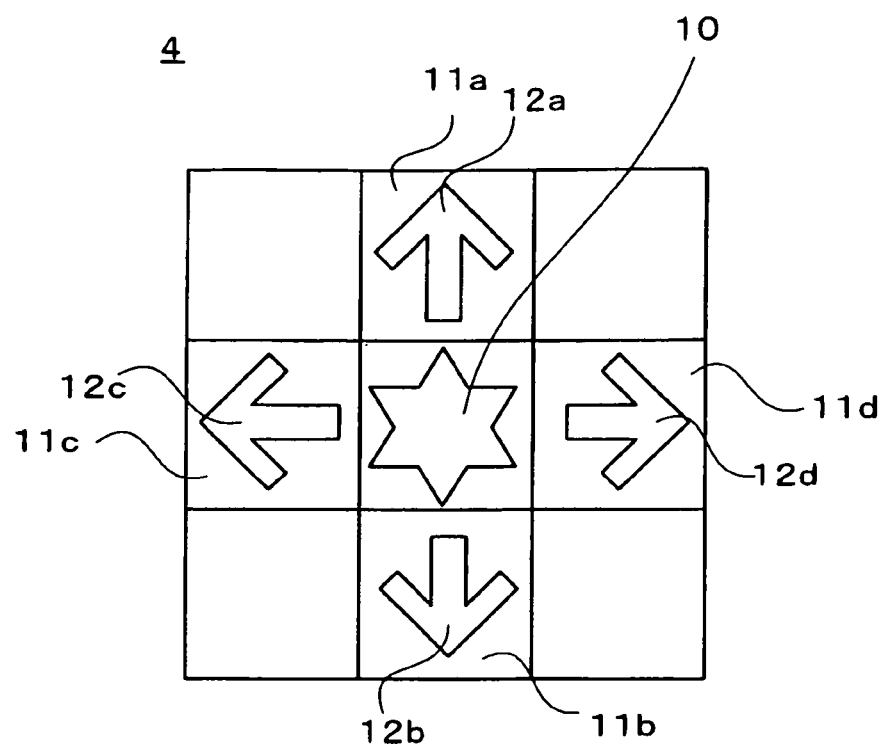
FIG. 2 is a diagram showing an example of an operation panel in FIG. 1.

As shown in FIG. 2, the operation panel 4 has a center part 10 and plural operation parts 11a, 11b, 11c, 11d (hereinafter referred to as the operation part 11, when distinction between them is not needed). Each of arrows 12a, 12b, 12c, 12d (hereinafter referred to as the arrow 12 when distinction between them is not needed), which indicates one of upward, downward, leftward, and rightward directions is represented on each of the operation parts 11a . . . 11d. It is enough that the construction of operation panel 4 is the same as the construction of a foot panel for home use or business use in a conventional music game system. For example, when any one of operation parts 11 is pushed by player's hand or player's foot, the operation panel 4 detects which operation part 11 has been pushed and the moment when the operation part 11 has been pushed, and outputs the operation detecting signal as signal according to the operation situation by the player. Hereinafter, the motion of pushing the operation part 11 is referred to as "to operate the operation part 11".

Figure 3A:
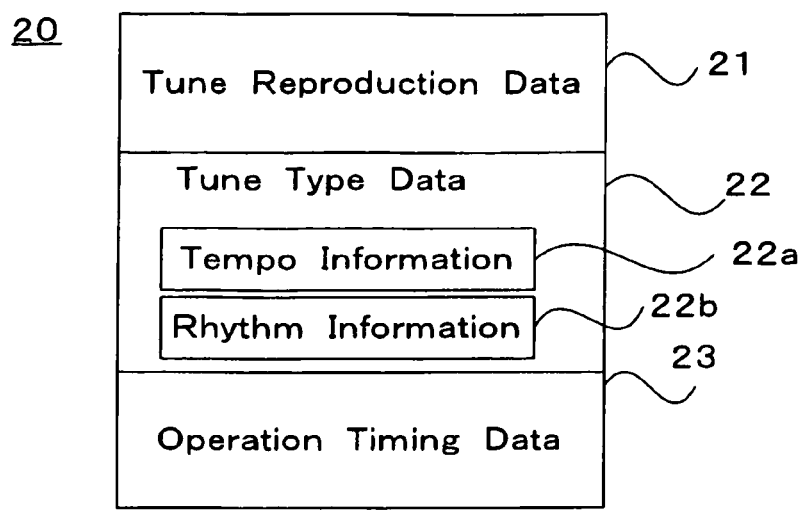
FIG. 3A is a diagram showing information stored in a storage medium.

The storage medium 5 of this mode is, for example, CD-ROM 5. As shown in FIG. 3A, tune information 20 having information for each of plural tunes is stored in the CD-ROM 5. The tune information 20 includes tune reproduction data 21, tune type data 22, and operation timing data 23. The tune reproduction data 21 is wave-shaped data to reproduce tunes, and is memorized in some format such as CD-DA or CD-ROM XA. In a tune to be reproduced in the game, the position where the reproduction starts is referred to as "a reproduction start position", and the position where the reproduction ends is referred to as "a reproduction end position".

The tune type data 22 includes tempo information 22a and rhythm information 22b to indicate tempo and rhythm of tune corresponded thereto. The operation timing data 23 is data for informing a player of the timing of operating each operation part 11 via the monitor 3b. The details of tempo information 22a, the rhythm information 22b, and the operation timing data 23 will be described later.

Figure 3B:
FIG. 3B is a diagram showing information stored in a storage medium.

The background image data shown in FIG. 3B is further memorized in the CD-ROM 5. The background image data is image data for outputting background image in a game screen, described later, on the monitor 3b. The background image of this mode is 3-dimensional image, in which a predetermined motif is set to perform predetermined movements in conformity to the tempo of the tune to be reproduced. Moreover, the modification of the background image can occur one after another depending on the evaluation of play (herein after referred to as "the play evaluation") as the play situation of a player. As the modifications of the background image depending on the play evaluation, more than 100 types of modifications such as color change and move change of the predetermined motif, have been set. Which type modification occurs is determined, for example, by using random numbers each time a tune reproduces. Concrete examples of background image to be modified depending on the play evaluation will be described later.

Figure 4:
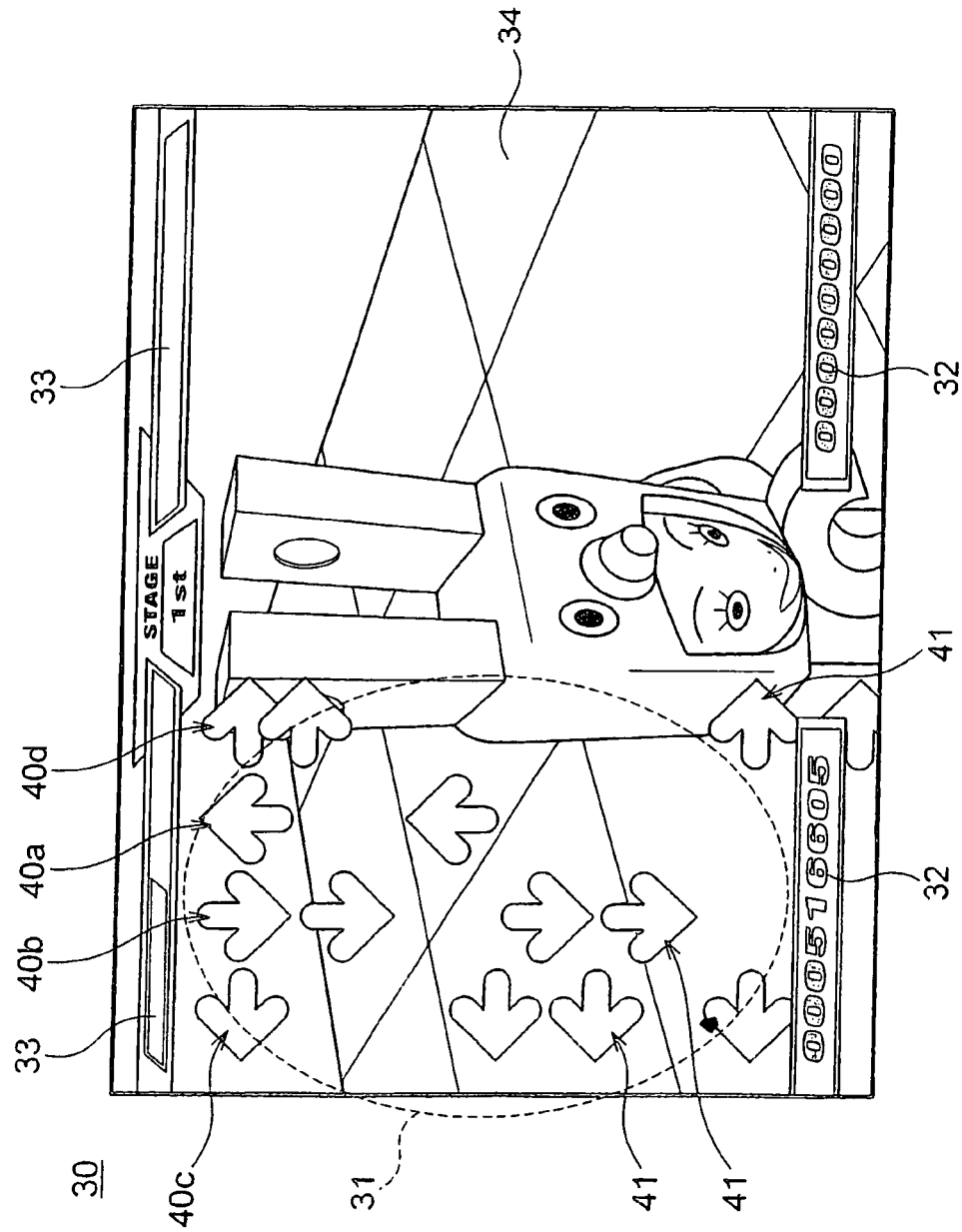
FIG. 4 is a diagram showing an example of a game screen.

In the game system 1, a game screen 30 shown in FIG. 4 is displayed on the monitor 3b during the game. The game screen 30 includes a mark displaying part 31 for displaying plural marks, a score part 32 for displaying player's score value SV, a stamina gauge part 33 for displaying player's stamina value TV, and a background image 34 displayed by the background image data 24. A predetermined value is given to the stamina value TV at the moment of starting the game, and the stamina value TV decreases depending on player's play contents. In the mark displaying part 31, there are four reference marks 40a . . . 40d which are displayed upward of the game screen 30 and don't move, and guiding marks 41 . . . 41 which appear downward of the game screen 30 and are scrolled toward the reference marks 40a . . . 40d.

Each of the reference marks 40a . . . 40d corresponds to each of the operation parts 11a . . . 11d. Hereinafter, the reference marks 40a . . . 40d and the guiding marks 41 . . . 41 are referred to as the reference mark 40 and the guiding mark 41 respectively, when distinction is not needed. The guiding mark 41 existing below each reference mark 40 is scrolled upward toward the reference mark 40, and overlaps the reference mark 40 on the upward game screen. A player is informed of the moment of the overlap as the operation timing of operating the operation part 11 corresponding to the reference mark 40.

As two players can play the game at the same time in the game system 1, two score parts 32 and two stamina gauge parts 33 are displayed on the game screen 30 for corresponding to each player. When the two players play the game at the same time, each of the mark displaying parts 31 corresponding to each player is displayed on the left side and the right side of the game screen 30 respectively. This mode is described about the case where only one player plays the game.

It will be described about the tempo information 22a, the rhythm information 22b, and the operation timing data 23. As shown in FIG. 5A, the tempo information 22a includes plural pieces of tempo data. The number of data pieces 22aC indicates the number of pieces of tempo data included in the tempo information 22a. One piece of the tempo data is constructed by elapsed time 22aA and number of beats 22aB which are associated with each other. The elapsed time 22aA indicates the elapsed time from the reproduction start position, and the number of beats 22aB indicates the total number of beats accumulated from the reproduction start position. For example, in the case where "120 seconds" is set to the elapsed time 22aA and "8," is set to the number of beats 22aB, that means "The number of beats is 8 from the reproduction start position until 120 seconds elapsing."

Additionally, in the case where "240 seconds" is set to the elapsed time 22aA and "8" is set to the number of beats 22aB, that means "the number of beats is 8 from the reproduction start position until 240 seconds elapsing". When the above two pieces of tempo data are set in the tempo information 22a, that means the tempo of tune is 15 seconds/beat from the reproduction start position until 120 seconds elapsing and after that, from the reproduction start position until 240 seconds elapsing, the tempo of the tune becomes 30 seconds/beat. Accordingly, the speed per one beat of tune, that is, the tempo of tune can be obtained from the tempo information 22a. Depending on the tempo obtained from the tempo information 22a, for example, display of guiding marks 41 on the game screen 30 is controlled.

As shown in FIG. 5B, the rhythm information 22b includes plural pieces of rhythm data. The number of data pieces 22bC indicates the number of pieces of rhythm data included in the rhythm information 22b. One piece of the rhythm data is constructed by number of beats 22bA and rhythm 22bB which are associated with each other. The number of beats 22bA is the total number of beats obtained by accumulating beats from the reproduction start position. For example, in the case where one rhythm data has the number of beats 22bA "0" and the rhythm 22bB "3", and another rhythm data has the number of beats 22bA "4" and the rhythm 22bB "4", that indicates the rhythm of the tune is 3 beats/bar from 0th beat, and from 4th beat the rhythm of the tune becomes 4 beats/bar. By referring the rhythm information 22b, for example, the number of bars can be counted from the number of beats counted during which the tune is reproduced.

Figure 7:
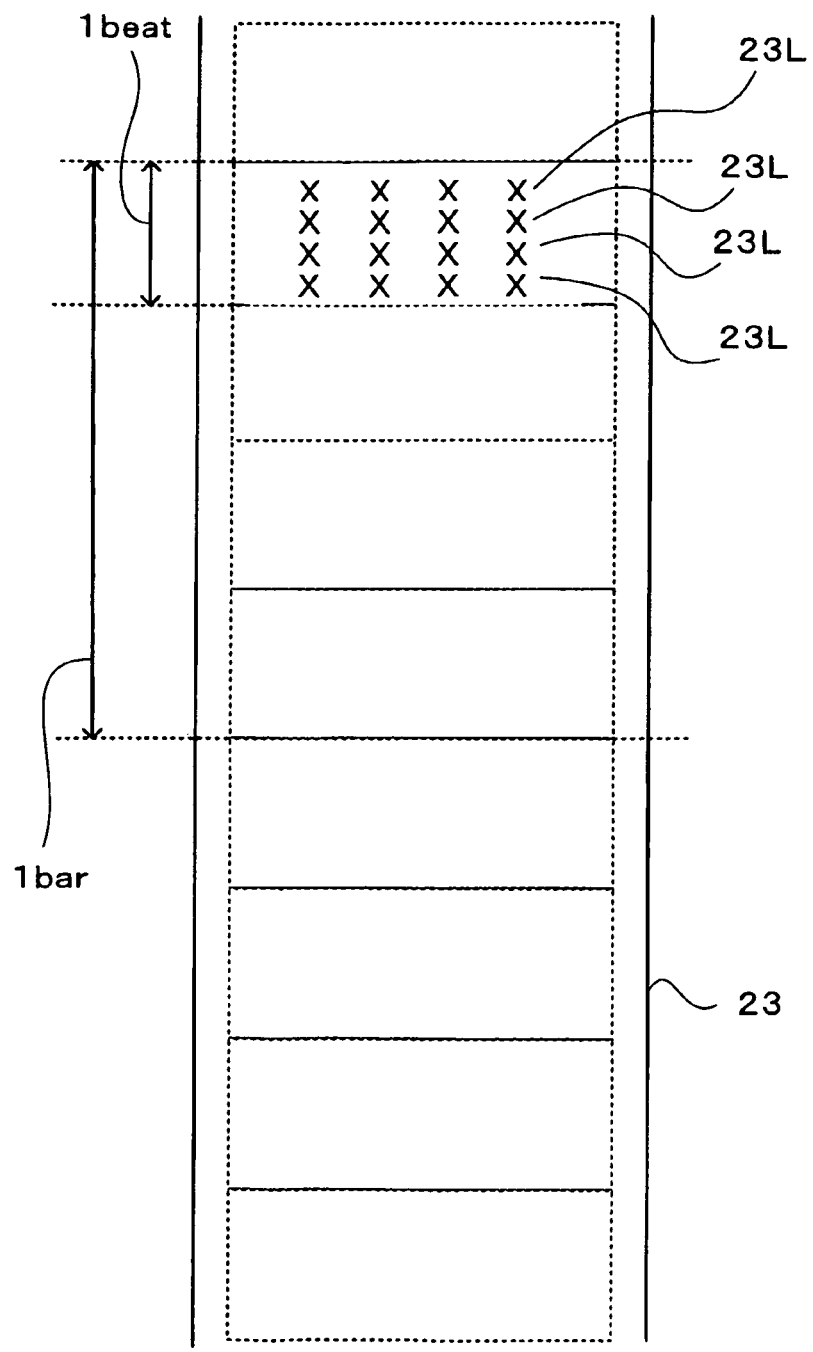
FIG. 7 is a diagram showing a relationship between operation timing data and beats.

It will be described about the operation timing data 23 in reference to FIG. 6 and FIG. 7. The operation timing data 23 includes, as shown in FIG. 6, plural lines each of which comprises "0" or "1". The bits of each line, starting from the left, correspond to the reference marks 40c, 40b, 40a, 40d of the mark displaying part 31 respectively. For example, the leftmost bit of each line corresponds to the reference mark 40c.

"1" means it is the operation timing of the corresponding reference mark 40, "0" means it is not the operation timing of the corresponding reference mark 40. For example, in the case of "0100", that means the operation timing only for the reference number 40b, and in the case of "1010", that means the operation timing both for the reference marks 40c and 40a.

In this way, each line in the operation timing data 23 means the same operation timing. Hereinafter, each line in the operation timing data 23 is referred to as a timing line 23L. As the four bits of the timing line 23L correspond to the mark displaying part 31 of one player, in the case of two players, the timing line 23L comprises 1 byte and the first four bits of the timing line 23L and the last four bits of the timing line 23L correspond to the mark displaying parts 31 for the players respectively.

In the operation timing data 23, the relationship between the timing line 23L and the beat of corresponding tune is set. For example, in FIG. 7, four timing lines 23L are associated with one beat. In this way, a predetermined number of lines 23L has been associated with one beat. Moreover, less than one line 23L can be associated with one beat. In the case of the operation timing data 23 shown in FIG. 7, when the rhythm is four beats/bar, sixteen timing lines 23L (four lines 23L×four beats) are included in one bar.

In the case where one beat has four timing lines 23L, when the operation timings set in the timing lines 23L are processed, it causes the operation timings of any one of the reference mark 40 to come four times for one beat. Moreover, when only the first timing line 23L in each beat is processed for the operation timing, the operation timings would come one time for one beat. Additionally, when only the first timing line 23L in each two beats is processed, the operation timing comes one time for two beats.

Accordingly, the speed of coming the operation timing, such as more than one operation timings for one beat or only one operation timing for plural beats, can be controlled depending on the number of timing lines 23L in one beat and which timing line 23L is processed. The information indicating the number of timing lines 23L included in one beat and which timing lines 23L in each beat should be processed has been set to, for example, the tune type data 22 in advance.

Accordingly, as the number of timing lines 23L included in one beat is set, in accordance with the tempo obtained from the tempo information 22a, the display of the guiding mark 41 is controlled so that the guiding mark 41 overlaps the reference mark 40 to be processed at the operation timing indicated in the operation timing data 23. For example, the number of beats requested from the moment of appearance of a guiding mark 41 to the moment when the guiding mark 41 overlaps the reference mark 40 has been determined as beats for scrolling in advance. The guiding mark 41 can be controlled to appear in the game screen 30 by the beats for scrolling before the operation timing.

In this mode, the modification of the background image 34 depending on the play evaluation is executed at a break position which is the position of change of bars. The range from one break position to the next break position is sometimes called "a break range". The break range in this mode is one bar. The appearance of modification differs depending on the play evaluation. As the play evaluation is higher, the degree of change of the background image 34 is bigger. An image change parameter GP indicating the amount of change is the value from 1 to 10. As the play evaluation is higher, the bigger value is set to the image change parameter GP. It will be described about concrete appearances of modification of the background image 34 in reference to FIGS. 8A, 8B, and 8c-FIGS. 11A, 11B, and 11C.

FIGS. 8A, 8B and 8C show a type that in the background image 34 the number of motifs 50 changes. FIG. 8A shows the background image 34 before the change. FIG. 8B shows the background image 34 representing the motifs 51 after the change in the case where the play evaluation is low (for example, the image change parameter GP=3, also in the case of low evaluation in the following cases, the same value is to set to the image change parameter GP.) FIG. 8C shows the background image 34 representing the motifs 52 after the change in the case where the play evaluation is high (for example, the image change parameter GP=10, also in the case of high evaluation in the following cases, the same value is set to the image change parameter GP.) As shown in FIGS. 8B and 8C, the degree of increase for the motifs 52 is bigger than the degree for the motifs 51. Accordingly, in this mode, the appearance of modification can be controlled so that the higher play evaluation makes the degree of change of the number of motifs 50 bigger.

FIGS. 9A, 9B and 9C show a type that in the background image 34 the flower buds of the motif 60 as the first appearance change to be flowers as the second appearance by so called morphing. FIG. 9A shows the background image 34 before the change. FIG. 9B shows the background image 34 representing the motif 61 after the change in the case where the play evaluation is low. FIG. 9C shows the background image 34 representing the motif 62 after the change in the case where the play evaluation is high. As shown in FIGS. 9B and 9C, the degree of flowering for the motif 62 is bigger than the degree for the motif 61. Accordingly, in this mode, the appearance of modification can be controlled so that the higher play evaluation makes the degree of change by morphing bigger.

FIGS. 10A, 10B and 10C show a type that the case where in the background image 34 the color of motif 70 changes to the predetermined color. FIG. 10A shows the background image 34 before the change. FIG. 10B shows the background image 34 representing the motif 71 after the change in the case where the play evaluation is low. FIG. 10C shows the background image 34 representing the motif 72 after the change in the case where the play evaluation is high. As shown in FIGS. 10B and 10C, the degree of color density for motif 72 is deeper than the degree for motif 71. Accordingly, in this mode, the appearance of modification can be controlled so that the higher play evaluation makes the degree of change of color bigger.

FIGS. 11A, 11B and 11C show a type that in the background image 34 the motion of the motif 80 changes. FIG. 11A shows the background image 34 before the change. FIG. 11B shows the background image 34 representing the motif 81 after the change in the case where the play evaluation is low. FIG. 11C shows the background image 34 representing the motif 82 after the change in the case where the play evaluation is high. The motif 80 only swings a little, and after the change, the motifs 81 and 82 moves also in a vertical direction in whole. As shown in FIGS. 11B and 11C, the motion of motif 82 is broader than the motion of motif 81. Accordingly, in this mode, the appearance of modification can be controlled so that the higher play evaluation makes the degree of motion broader.

It will be described about the game procedure executed in the game system 1 in accordance with flow charts shown in FIG. 12-FIG. 15. First, the initial setting is executed in step S100. In the initial setting, parameters used in the game, such as parameters SV, TV and counters BC, SC, MT are initialized. Next, in step S110 a tune selection process is executed. In the tune selection process, for example, a list of tunes capable of being reproduced is displayed on the monitor 3b and the tune to be reproduced is selected by specification of a player. Then, the process proceeds to step S120 to execute the tune reproduction process. In the tune reproduction process, the reproduction of selected tune starts and, at the same moment as the start of the reproduction, timekeeping by a tune reproduction timer MT as a timekeeping device starts.

The tune reproduction timer MT keeps time of reproducing a tune from the start of reproduction.

When the reproduction of tune starts, a game play control process for informing the player of the operation timing, a count control process for counting the present number of beats and the present number of bars, and a background image control process for controlling appearance of the background image 34 are executed in step S130, in step S140, and in step S150 respectively. Each of the processes repeats until the game ends. The details of each process will be described later.

Figure 13:
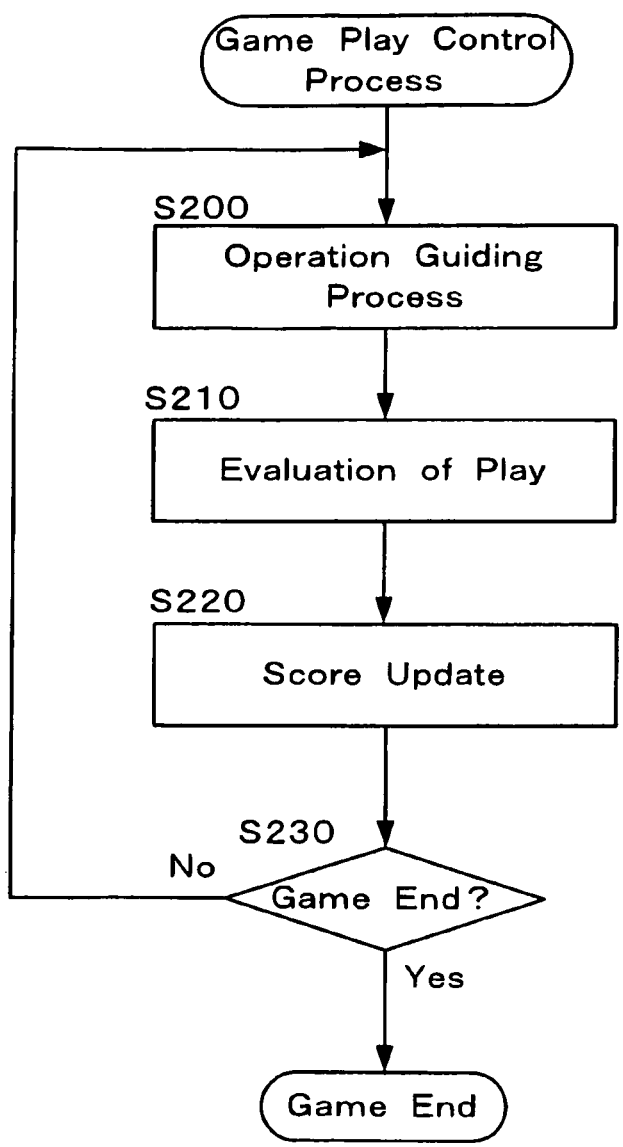
FIG. 13 is a flowchart showing process flow in the game play control process.

The processes executed in the game play control process will be described in accordance with the flow chart shown in FIG. 13. The game play control process is controlled by the control part 7. First, in step S200, an operation guiding process is executed. In the operation guiding process, as mentioned above, the player is informed of the operation timings by the guiding marks 41 of each reference mark 40 displayed based on the operation timing data 23 and the tempo information 22*a*. Thereby, the control part 7 functions as the operation guiding device 7*a*. Next, in step S210 player's play is evaluated. Thereby, the control part 7 functions as the evaluation device 7*b*. It is enough that the player's play is evaluated in the conventionally known way.

For example, by comparing the operation timing indicated in the operation timing data 23 to the actual operation moment by the player obtained by the operation detecting signal, the amount of deviance between them is calculated by the predetermined calculation, and depending on the amount of deviance the evaluation can be obtained. As the amount of deviance is smaller, the play evaluation gets higher, and as the amount of deviance is bigger, the play evaluation gets lower. Additionally, a level of difficulty of operation can be set to each operation in advance. In this case, when the operation of high level difficulty is done within the predetermined range of the amount of deviance, the play evaluation gets higher. It does not matter which the player's play is evaluated for each operating timing or for each block of plural operating timings. Next, the process proceeds to step S220 to update the score value SV in accordance with the play evaluation determined in step S210. In accordance with this update, the display of the score part 32 is also updated.

Additionally, the stamina value TV of the player is updated depending on the play situation at appropriate timings. In accordance with this update, the display of the stamina gauge part 33 is also updated. Next, in step S230 it is determined which the game is over or not, when it is determined that the game is over, the game play control process ends. In this mode, when the reproduction of tune comes to end or when the stamina value TV comes to be "0", it is determined that the game is over. When it is determined that the game is not over in step S230, the process returns to step S200 and the game play control process is executed repeatedly.

Figure 14:
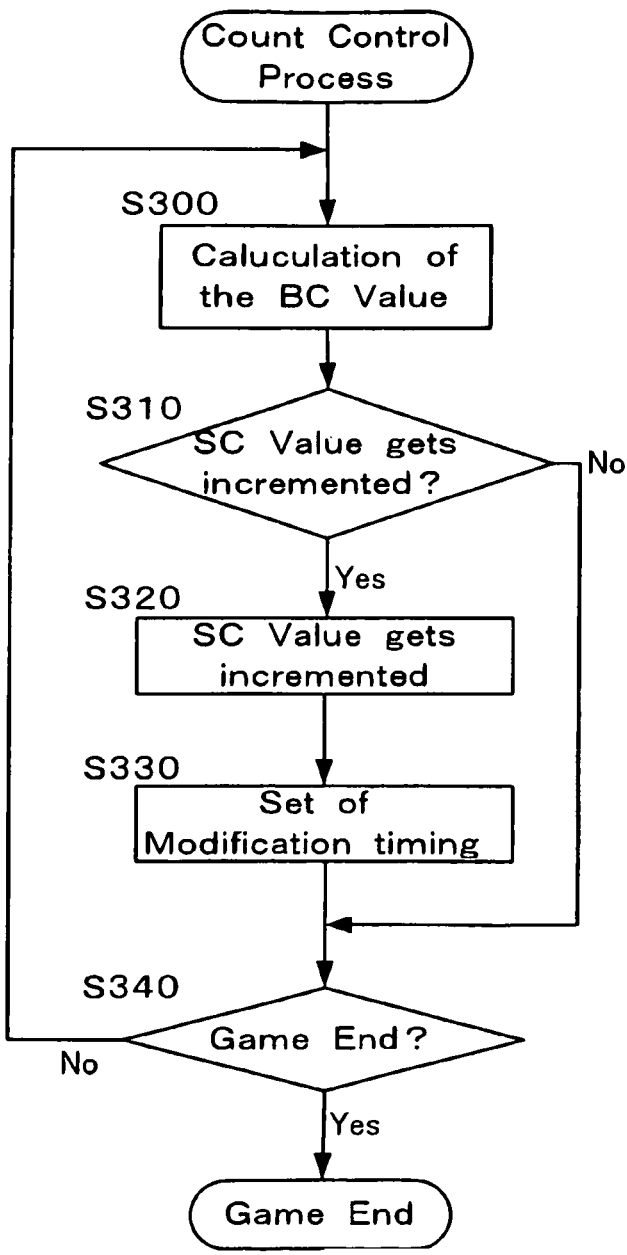
FIG. 14 is a flowchart showing process flow in the count control process.

The processes executed in the count control process will be described in according to the flowchart shown in FIG. 14. The count control process is controlled by the control part 7; thereby the control part 7 functions as the break position monitoring device 7*c*. In step S300, the present number of beats is calculated by the present elapsed time obtained from the tune reproduction timer MT and the tempo information 22*a* to set the value of a beats counter BC. The beats counter BC counts total number of beats from the reproduction start position of the tune being reproduced. For example, the closest two pieces of tempo data to the present elapsed time are selected from the tempo information 22*a*, and the present total number of beats can be calculated by the predetermined formulations.

Next, in step S310, it is determined which a bar counter SC gets incremented or not by referring the beats counter BC and the rhythm information 22*b*. The bar counter SC counts the number of bars. For example, a sub beats counter SBC for counting beats in one bar has been prepared, in the case where the present rhythm is 4 beats/bar, at the moment when the sub beats counter SBC comes to be over 4, the bar counter SC gets incremented. The sub beats counter SBC returns to "1" each time the bar counter gets incremented, and gets incremented at the same time of the increment of the beats counter BC.

When it is determined that the bar counter SC gets incremented in step S310, the process proceeds to step S320 for incrementing the bar counter SC, and in step S330 a modification timing as the break position is set to come in one bar. For example, the number of beats before the next bar can be obtained by the tempo information 22*a* and the rhythm information 22*b*, and required time for the obtained number of beats can be calculated, the required time can be set to the modification timer ET, and some complement can be done appropriately. Alternatively, the modification timer ET can be set to count the number of beats required to reach the next modification timing by using the sub beats counter SBC and the beats counter BC. As it is enough that the modification timing is the moment of changing bars, it is not needed that the modification timing comes each bar. Therefore, the modification timing can be set to come for every given number of bars. In this case, each number of bars between the modification timings can be predetermined, or can be set randomly during the game. The required time or the required beats corresponding to the set number of bars can be set to the modification timer ET for counting to the next modification timing.

After setting the modification timer ET, and when it is determined that the bar counter SC dose not get incremented in step S310, the process proceeds to step S340. In step S340, it is determined which the game is over or not. For example, it is determined that the game is over when it is determined the game is over in the game play control process. In step. S340, if it is determined that the game is not over, the process returns to step S300 to repeat the count control process.

The processes executed in the background image control process will be described in accordance with the flowchart shown in FIG. 15. The background image control process is controlled by the control part 7, and thereby the control part 7 functions as the background image control device 7*d*. First, in step S400, the background image 34 suitable to the present tempo is displayed. For example, in the case where a dancer as a motif moving predetermiendly is displayed in the background image 34, the speed of the dancer's motion is set to be suitable to the tempo.

It is determined which it is the modification timing or not in step S410. In this mode, it is determined that it is the modification timing each time the modification timer ET comes to 0. When it is determined that it is not the modification timing, the process proceeds to the step S440. When it is determined that it is the modification timing, the process proceeds to step S420 to set the image change parameter GP. The image change parameter GP, as mentioned above, is the parameter indicating the amount of change of background image 34, and gets set depending on the score value SV each time the modification timing comes.

In this mode, 10 levels as the degree of change are prepared. The image change parameter GP gets set to any value from 1 to 10 depending on the score value SV. After setting the image change parameter GP, the process proceeds to step S430 to modify the image data in the frame buffer 3*a* to display the background image 34 on the degree depending on the image change parameter GP. Thereby, the background image 34 can be displayed in the appearance of modification depending on the play evaluation. The differences between the appearances of modification depending on the play evaluation have been described above. Therefore, the background image 34 modified depending on the score value SV is displayed on the monitor 3a. It may be determined by using random numbers as mentioned above, which type of the modifications is used at each modification timing.

In step S440, it is determined which the game is over or not. For example, it can be determined that the game is over when it is determined that the game is over in the game play control process. When it is determined that the game is not over, the process returns to step S400 to repeat the background image control process.

The present invention can be executed in various modes, not limited to the above mentioned mode. For example, the modification in the background image 34 depending on the play evaluation can be set by combining plural types of modifications, such as the combination of "change of color" and "change of motion". Each type of modifications may have the different image change parameter. When the image change parameter or the score value does not reach the predetermined level, it may be set that the modification of background image does not occur. It does not matter which kind of motif is adopted in the background image 34, such as dancers, animals, structures, and vehicles. Plural kinds of background image data can be prepared. In this case, the background image to be used can be selected randomly, or each background image data can be associated with plural tunes in advance.

The image change parameter GP can be set by the predetermined calculation including the value obtained by parameterizing play situation, like a play elapsed time and number of plays. Although in this mode the modification timing is set for each bar, the timing can be set for each plural bars, and it is not needed that the number of bars as the distinction range is the same. In this case, the bar counter SC can be used as a counter for counting number of bars as the distinction range. The modification timing can be set so that the timing comes by the beat not by the bar.

The operation panel can be a general-purpose controller of a game machine for home use. In this case, each operation button mounted on the general-purpose controller can correspond to each of the reference marks. The operation panel can be an input device, looking like an instrument, dedicated to a game system. In this case, each member for operating of the instrument can correspond to each of the reference marks. It does not matter which the storage medium stores information magnetically or optically, it is enough to store information necessary for this invention.

The invention claimed is:

1. A game system comprising:
an input device for outputting signals when operation members mounted thereon are operated;
a game information storage device for storing plural pieces of tune data for reproducing each tune and operation timing data being associated with each piece of the tune data and deciding operation timings of operating each of the operation members to the tune to be reproduced;
a display device for displaying some image;
a tune reproduction device for reproducing a tune based on the piece of tune data; and
an operation guiding device for, based on the operation timing data of the tune reproduced by the reproduction device, informing a player of the operation timing of the operation member to the reproduced tune via the display device,
wherein the game information storage device stores background image data for a game background image displayed by the display device together with the reproduced tune, and
the game system further comprises:
a break position monitoring device for, during which the tune is reproduced, monitoring at least one break positions being set in units of beats in the tune; and
a background image control device for controlling appearance of modification of the game background image so that the appearance of modification is different between before and after the break position depending on play situation of the player, when the break position monitoring device recognizes the break position in a middle of the tune being reproduced;
wherein
the game information storage device further stores a plurality of types of image change parameters with respect to a common modification portion, each type of image change parameter indicating an amount of modification of the modification portion and being correlated with different maximum and minimum level number combinations from each other so that an amount of modification per level is different depending on the type of image change parameter even for the same play situation,
at least one type of image change parameter being correlated to a certain maximum and minimum level numbers is associated with the image data for the game background image,
the modification portion being a portion that is modified in the game background image, and
the background image control device sets a value of said at least one type of image change parameter in accordance with the current play situation and controls an appearance of the modification portion of the game background image so that the modification of the game background image occurs depending on the level corresponding to the set value of said at least one type of image change parameter.

2. The game system according to claim 1, wherein
the game system further comprises an evaluation device for evaluating the signals outputted by the input device when operation members mounted thereon are operated by the player, and
the background image control device controls the appearance of modification of the game background image so that the appearance of modification changes depending on evaluation by the evaluation device.

3. The game system according to claim 1, wherein
tempo information having information relevant to tempo in at least one predetermined range in a tune is further associated with the piece of tune data to be stored in the game information storage device,
the break position monitoring device has
a timekeeping device for keeping elapsed time of a tune reproduced from a start position of the predetermined range of the tune and
a beats count device for counting number of beats from the start position of the predetermined range in reference to the elapsed time kept by the timekeeping device and the tempo information.

4. The game system according to claim 3, wherein
the predetermined range is a range from a start position of reproducing the tune to a position of changing tempos;
the tempo information including a piece of tempo data for each different tempo, the piece of tempo data comprising elapsed time and total number of beats which are associated with each other, the elapsed time being time from the start position of reproducing the tune to the position of changing tempos and the total number of beats being total number of beats at the moment of the elapsed time from the start position of reproducing the tune under a tempo corresponding to the elapsed time;
information indicating relationship between number of beats and the operation timing is set in the operation timing data;
the break position monitoring device calculates a present tempo based on the elapsed time obtained by the timekeeping device; and
the operation guiding device informs the player of the operation timing so that a relationship between the elapsed time and the total number of beats indicated by each of the pieces of tempo data of the tempo information is equal to a relationship between the number of beats obtained by the operation timing data and the elapsed time obtained by the timekeeping device.

5. The game system according to claim 3, wherein
rhythm information relevant to rhythm of each of the tunes associated with each piece of tune data to be stored in the game information storage device, and
the break position monitoring device has a bar counting device for counting number of bars of the tune being reproduced by the number of beats counted by the beats count device and the rhythm information.

6. The game system according to claim 3, wherein
the background image control device controls the game background image to be displayed so that appearance of the game background image is different depending on the information relevant to tempo indicated by the tempo information.

7. A game apparatus comprising:
an input device for outputting signals when operation members mounted thereon are operated;
a game information storage device for storing plural pieces of tune data for reproducing each tune and operation timing data being associated with each of the pieces of tune data and deciding operation timings of operating each of the operation members to the tune to be reproduced;
a display device for displaying some image;
an operation guiding device for, based on the operation timing data of the tune reproduced by the reproduction device, informing a player of the operation timing of the operation member to the reproduced tune via the display device,
wherein the game information storage device stores background image data for a game background image displayed by the display device together with the reproduced tune, and
the game apparatus further comprises:
a tune reproduction device for reproducing a tune based on the piece of tune data;
a break position monitoring device for, during which the tune is reproduced, monitoring at least one break positions being set in units of beats in the tune; and
a background image control device for controlling appearance of modification of the game background image so that the appearance of modification is different between before and after the break position depending on play situation of the player, when the break position monitoring device recognizes the break position in a middle of the tune being reproduced;
wherein
the game information storage device further stores a plurality of types of image change parameters with respect to a common modification portion, each type of image change parameter indicating an amount of modification of the modification portion and being correlated with different maximum and minimum level number combinations from each other so that an amount of modification per level is different depending on the type of image change parameter even for the same play situation,
at least one type of image change parameter being correlated to a certain maximum and minimum level numbers is associated with the image data for the game background image, the modification portion being a portion that is modified in the game background image, and
the background image control device sets a value of said at least one type of image change parameter in accordance with the current play situation and controls an appearance of the modification portion of the game background image so that the modification of the game background image occurs depending on the level corresponding to the set value of said at least one type of image change parameter.

8. A computer program for game, stored on a non-transitory computer readable medium, being encoded to allow a game apparatus to function as:
an input device for outputting signals when operation members mounted thereon are operated;
a game information storage device for storing plural pieces of tune data for reproducing each tune and operation timing data being associated with each of the pieces of tune data and deciding operation timings of operating each of the operation members to the tune to be reproduced, and background image data for a game background image displayed by the display device together with the reproduced tune;
a display device for displaying some image;
a tune reproduction device for reproducing a tune based on the piece of tune data;
an operation guiding device for, based on the operation timing data of the tune reproduced by the reproduction device, informing a player of the operation timing of the operation member to the reproduced tune via the display device,
a break position monitoring device for, during which the tune is reproduced, monitoring at least one break positions being set in units of beats in the tune; and
a background image control device for controlling appearance of modification of the game background image so that the appearance of modification is different between before and after the break position depending on play situation of the player, when the break position monitoring device recognizes the break position in a middle of the tune being reproduced;
wherein
the game information storage device further stores a plurality of types of image change parameters with respect to a common modification portion, each type of image change parameter indicating an amount of modification of the modification portion, and being correlated with different maximum and minimum level number combinations from each other so that an amount of modification per level is different depending on the type of image change parameter even for the same play situation,
  at least one type of image change parameter being correlated to a certain maximum and minimum level numbers is associated with the image data for the game background image,
  the modification portion being a portion that is modified in the game background image, and
  the background image control device sets a value of said at least one type of image change parameter in accordance with the current play situation and controls an appearance of the modification portion of the game background image so that the modification of the game background image occurs depending on the level corresponding to the set value of said at least one type of image change parameter.

9. The game system according to claim 2, wherein
tempo information having information relevant to tempo in at least one predetermined range in a tune is further associated with the piece of tune data to be stored in the game information storage device,
the break position monitoring device has
a timekeeping device for keeping elapsed time of a tune reproduced from a start position of the predetermined range of the tune and
a beats count device for counting number of beats from the start position of the predetermined range in reference to the elapsed time kept by the timekeeping device and the tempo information.

10. The game system according to claim 9, wherein
the predetermined range is a range from a start position of reproducing the tune to a position of changing tempos;
the tempo information including a piece of tempo data for each different tempo, the piece of tempo data comprising elapsed time and total number of beats which are associated with each other, the elapsed time being time from the start position of reproducing the tune to the position of changing tempos and the total number of beats being total number of beats at the moment of the elapsed time from the start position of reproducing the tune under a tempo corresponding to the elapsed time;
Information indicating relationship between number of beats and the operation timing is set in the operation timing data;
the break position monitoring device calculates a present tempo based on the elapsed time obtained by the timekeeping device; and
the operation guiding device informs the player of the operation timing so that a relationship between the elapsed time and the total number of beats indicated by each of the pieces of tempo data of the tempo information is equal to a relationship between the number of beats obtained by the operation timing data and the elapsed time obtained by the timekeeping device.

11. The game system according to claim 4, wherein
rhythm information relevant to rhythm of each of the tunes associated with each piece of tune data to be stored in the game information storage device, and
the break position monitoring device has a bar counting device for counting number of bars of the tune being reproduced by the number of beats counted by the beats count device and the rhythm information.

12. The game system according to claim 9, wherein
rhythm information relevant to rhythm of each of the tunes associated with each piece of tune data to be stored in the game information storage device, and
the break position monitoring device has a bar counting device for counting number of bars of the tune being reproduced by the number of beats counted by the beats count device and the rhythm information.

13. The game system according to claim 10, wherein
rhythm information relevant to rhythm of each of the tunes associated with each piece of tune data to be stored in the game information storage device, and
the break position monitoring device has a bar counting device for counting number of bars of the tune being reproduced by the number of beats counted by the beats count device and the rhythm information.

14. The game system according to claim 9, wherein
the background image control device controls the game background image to be displayed so that appearance of the game background image is different depending on the information relevant to tempo indicated by the tempo information.

* * * * *